April 23, 1940.    R. BODE ET AL    2,198,023
INSTRUMENT, MORE PARTICULARLY GYROSCOPIC APPARATUS
Filed Aug. 23, 1938

RICHARD BODE  *Inventors*
ACHIM VON PETERY

By

*Attorneys*

Patented Apr. 23, 1940

2,198,023

UNITED STATES PATENT OFFICE 2,198,023

INSTRUMENT, MORE PARTICULARLY GYROSCOPIC APPARATUS

Richard Bode and Achim von Petery, Kiel, Germany, assignors to Anschutz & Co. G. m. b. H., Kiel-Neumuhlen, Germany Application August 23, 1938, Serial No. 226,401
In Germany August 24, 1937

5 Claims. (Cl. 173—324)

Our invention relates to an instrument in which a plurality of electric circuits extends between two relatively rotatable elements, more particularly, to a gyroscopic apparatus.

In electrically operated gyroscopic apparatus, the conduction of the current for instance of the current operating the gyroscope motor, presents a difficult problem because the electric circuits extend between two relatively rotatable members, for instance, from the supporting frame of the instrument to an element swivelled therein. The object of our invention is to provide, in such an instrument, current conducting means which shall exert as little mechanical resistance and friction on the swivelled member and shall not give rise to high frequency disturbances caused by sparks and shall limit the liberty of angular motion of the swivelled element as little as possible.

Ordinarily the means for establishing circuits between two relatively rotatable members are slip rings and brushes but these means involve undesirable friction. Other means frequently used are highly flexible electrical conductors but such conductors will invariably exert undesirable forces on the gyroscopic system even though such forces may be small.

It has been proposed prior to our invention to provide contact points contacting with the end faces of the two pivots of the rotatable member, the pivots being electrically insulated from one another and included in the electric circuit (compare the German Patent No. 436,173). In this way, however, a single circuit only can be established. Frequently, it is desirable, however, to establish a plurality of electric circuits extending from one member to the other. This is true for instance when a polyphase current must be conducted from one member to the other, for instance, a three phase current for the operation of a gyroscope motor.

We attain these and other objects by mounting a plurality of contact points adjacent to the bearing of one of the pivots in axial alignment therewith.

Because of the aligned location of the contact points in the axis of rotation, the friction will be so small that as many as seven pairs of contacts will have a combined friction of rest which does not exceed that of a high-grade ball bearing. In operation, the coefficient of friction is even much lower.

Figure 1:
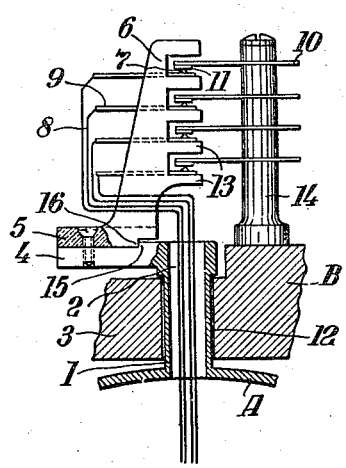
Figure 2:
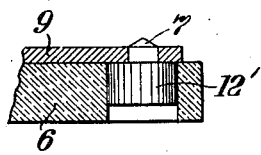

A preferred embodiment of our invention is illustrated in the accompanying drawing in which Fig. 1 is an elevation, partly in axial section, of the bearing of a gyroscopic instrument and of the coordinated electrical connections, and Fig. 2 is a detail of Fig. 1 shown in section on an enlarged scale.

The gyroscopic instrument includes two relatively rotatable members A and B, to wit a gimbal ring A and the frame B of the instrument. The member B is provided with a bearing such as a sliding bearing 12 in which a pivot 1 attached to the member A is journalled. Instead of a sliding bearing, an antifriction bearing or any other kind of bearing may be chosen.

The member A carries electrical equipment requiring that four different electrical paths be established thereto extending from terminals provided on the frame B. Therefore, the pivot is hollow as indicated at 2 and accommodates four electrical conductors 8 each of which is connected to a piece 9 of sheet metal. These pieces of sheet metal are mounted on a holder 6 in form of a comb which is preferably made of an insulating material and is provided with a base portion 5 attached to a flange 4 of the pivot 1. The teeth 13 of the comb-shaped holder 6 are provided with a bore extending coaxially to the bearing 12.

In Fig. 2, we have shown a vertical section through one such tooth. In the bore, there is inserted a cylindrical member 12' provided with a pointed pin 7 to which the sheet metal member 9 is soldered or otherwise electrically connected.

The pointed pins 7 constitute electrical contacts cooperating with leaf springs 10 extending transversely to the axis of the bearing 12. Each leaf spring carries a contact blade 11 bearing against the pointed pin 7. The leaf springs are mounted on a holder 14 of an insulating material which is suitably attached to the member B. Each leaf spring 10 is connected with one of the above mentioned terminals by electrical conductors not shown.

As the holes accommodating the cylindrical members 12' form part of a single bore, they may be produced within a single operation and may be accurately coaxially aligned with the bearing 12. For this purpose, the flange 4 may be provided with an arcuate shoulder 15 cooperating with a similar shoulder 16 provided on the base portion 5. Preferably, the shoulder 16 is produced on the same machine as, and coaxially with, the bore extending through the teeth 13.

Owing to this arrangement, the holder 6 may be easily so mounted that the contact points will be very accurately aligned coaxially with the bearing 12. Accuracy in this regard is required to minimize friction. The cylindrical members 12' are preferably secured in position in the teeth 13 by a pressed fit, or they may be secured therein by a suitable binding material.

Obviously, the arrangement could be readily reversed by attaching the holder 14 to the pivot 1 and the holder 6 to the member B. Also, it would be possible in order to balance the axial forces exerted on the pivot 1 by the leaf springs 10 to divide the pins 7 in two groups facing in opposite directions. In this event, the leaf springs would bear against the pins of one group from above and against the pins of the other group from below thus balancing each other. In this way, the bearings 12 would be relieved from any axial load.

Numerous other possible modifications offer themselves readily to anyone skilled in the art. Therefore, we wish it to be understood that our invention is not limited to the specific details of the embodiment shown in Fig. 1 but is to be construed in accordance with the spirit of the claims following hereinafter.

What we claim is:

1. In an instrument of the character described, the combination including a member provided with a bearing; a second member provided with a pivot journalled in said bearing; and means for establishing a plurality of electric circuits extending from one of said members to the other, said means comprising a plurality of pairs of contact elements, each pair of elements including a point contact element, one contact element of each pair being mounted on one of said members, and the other contact of each pair of elements being mounted on the other one of said members, said point contact elements being in axial alignment with said bearing; and means on one of said members offset from the axis of said bearing for supporting said contacts.

2. In a gyroscopic apparatus including the combination comprising two relatively rotatable members, a bearing mounted on one member, a pivot attached to the other member and journalled in said bearing, means for conducting a polyphase current from one of said members to the other including two holders, one holder mounted on one of said members and the other holder mounted on the other member, a plurality of pins mounted on one of said holders in axial alignment with said pivot, and a plurality of leaf springs mounted on the other holder and contacting with the points of said pins.

3. In a gyroscopic apparatus including the combination comprising two relatively rotatable members, a bearing mounted on one member, a hollow pivot attached to the other member and journalled in said bearing, means for conducting a polyphase current from one of said members to the other including two holders of insulating material, one holder mounted on one of said members and the other holder mounted on the other member, a plurality of pins of conducting material mounted on one of said holders, a plurality of contact elements mounted on the other holder and contacting with said pins, the points of contact being located on the axis of said bearing, and a plurality of electrical conductors extending through said hollow pivot to the conducting elements mounted on said holder associated with said pivot.

4. In a gyroscopic apparatus including the combination comprising two relatively rotatable members, a bearing mounted on one member, a pivot attached to the other member and journalled in said bearing, means for conducting a polyphase current from one of said members to the other including two holders, one holder mounted on one of said members and the other holder mounted on the other member, a plurality of pins mounted on one of said holders, and a plurality of contact elements mounted on the other holder and contacting with said pins, the points of contact being located on the axis of said bearing, the holder carrying said pins being formed by a comb piece provided with a bore extending through its teeth coaxially with said bearing, the pins of conducting material being inserted in said bore.

5. In a gyroscopic apparatus including the combination comprising two relatively rotatable members, a bearing mounted on one member, a pivot attached to the other member and journalled in said bearing, means for establishing a plurality of electric circuits from one of said members to the other, including two holders, one holder mounted on one of said members and the other holder mounted on the other member, a plurality of pins mounted on one of said holders, and a plurality of contact elements mounted on the other holder and contacting with said pins, the points of contact being located on the axis of said bearing.

RICHARD BODE.
ACHIM von PETERY.